Sept. 4, 1951 W. F. ALLMOND 2,566,303
LUGGAGE RAILING FOR AUTOMOTIVE VEHICLES
Filed Jan. 5, 1950
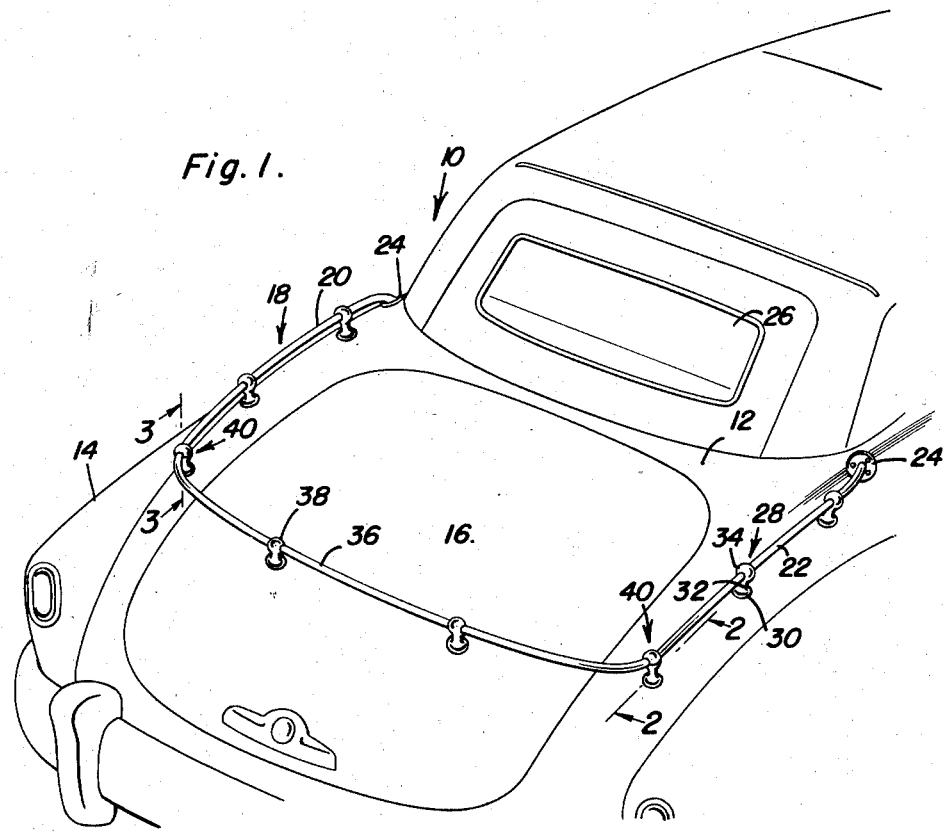
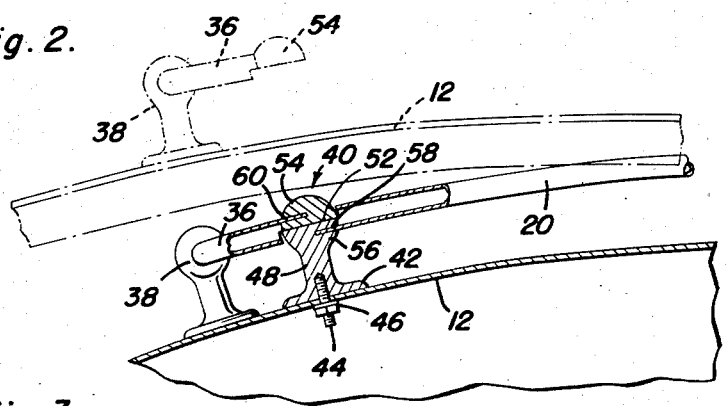
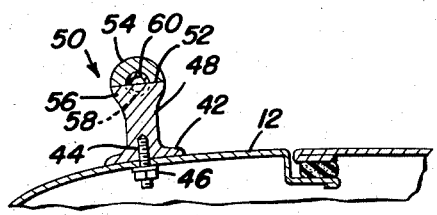
William F. Allmond
INVENTOR.

Patented Sept. 4, 1951

2,566,303

UNITED STATES PATENT OFFICE 2,566,303

LUGGAGE RAILING FOR AUTOMOTIVE VEHICLES

William F. Allmond, Norfolk, Va.

Application January 5, 1950, Serial No. 136,919

3 Claims. (Cl. 224—42.42)

This invention relates to a decorative railing positioned on the rear body portion of an automotive vehicle and is primarily designed to retain excess baggage.

An important object of this invention is to provide a luggage railing which is relatively simple in design and construction, which can be readily assembled and disassembled upon the rear body portion of an automotive vehicle, which is attractive in appearance, and which is constructed in such a manner that it will not interfere with the opening and closing of the trunk door of the automotive vehicle.

Yet another object of this invention is to provide in an automotive vehicle having a rear body portion, rear fenders, and a trunk door hinged at the rear body portion, a luggage retaining means comprising a railing including side portions, means for retaining said side portions in spaced relation upon the body portion adjacent the fenders, said railing including a further portion extending across and supported upon the trunk door, and means for detachably connecting said side portions to said further portion whereby the latter will move with the trunk door when the same is opened.

These, together with various ancillary objects and features of the invention which will later become apparent as the following description proceeds, are attained by the device, a preferred embodiment of which has been illustrated, by way of example only, in the accompanying drawings, wherein:

Figure 1 is a perspective view of the railing shown assembled upon the rear body portion of an antomotive vehicle;

Figure 2 is a sectional view taken substantially upon the plane of section line 2—2 of Figure 1; and Figure 3 is a sectional view taken substantially upon the plane of section line 3—3 of Figure 1.

Specific reference will now be made to the drawings. In the accompanying drawings and in the following specification, similar reference characters indicate corresponding elements throughout.

Indicated generally at 10 is any conventional automotive vehicle having a rear body portion 12, rear fenders 14, and a trunk door 16 hinged in the rear body portion 12, as will be readily understood. The present invention is generally indicated at 18 and is, in effect, a decorative railing secured in a particular manner on the rear body portion of the automotive vehicle and adapted to retain excess luggage and baggage.

The device consists of a metallic railing having side portions 20 and 22 which are secured at their rear ends by means of attaching flanges 24 to the rear body portion 12 and at the sides of the car immediately adjacent the rear window 26 thereof. The side portions 20 and 22 of the railing extend rearwardly of the automotive vehicle and are secured in spaced relationship to the rear body portion 12 of the automotive vehicle between the fenders 14 and the trunk door 16. The means for retaining the side portions on the rear body portion and spaced therefrom are a series of brackets 28, each bracket including an attaching flange 30, a spacer stem 32, and an apertured knob 34 at the top of the stem through which the side portions extend.

The railing further includes a transverse portion 36 which extends across the trunk door 16 and is retained thereon by a plurality of brackets 38 which are the same in construction and design as the brackets 28.

In order to permit the trunk door 16 to open and close freely despite the assemblage of the railing thereon, the free ends of the transverse portion 36 are removably secured to the adjacent free ends of the side portions 20 and 22 by the following means. A pair of attaching brackets 40 are secured to the rear body portion 12 between the rear fenders 14 and the trunk door 16. Each of these brackets includes a flange 42 which is secured to the rear body portion by means of an attaching screw 44 and nut 46. The flange 42 includes an integral stem or spacer element 48 and a knob 50 thereon, the knob being split horizontally, as at 52, to provide a movable member 54 at the upper portion of the knob and a fixed member 56 at the lower portion of the knob. The adjacent end of each of the side members 20 and 22 is cut out to form a lip portion 58 that is embedded or secured in the fixed portion 56 and each free end of the transverse portion 36 of the railing is similarly cut out to provide a lip portion 60 that is embedded in or secured to the movable portion 54 of the bracket.

In use, the railing, including the side portions 20 and 22 and the transverse portion 36, is readily and easily assembled upon the rear body portion 12 and the trunk door 16 in a manner which will be readily apparent to those skilled in the art. It will be understood that excess baggage and luggage can be positioned upon the rear body portion 12 and the trunk door 16, the railing serving as a guard for the luggage and baggage. When it is desired to open and close the trunk door 16, the same can be effected without disassembling the railing inasmuch as the transverse portion of the railing 36 will move with the trunk door 16 and assume the position shown in dotted lines in Figure 2 while the side portions 20 and 22 will, of course, remain fixed upon the rear body portion of the automotive vehicle.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. In an automotive vehicle having a rear body portion, rear fenders, and a trunk door hinged at the rear body portion, a luggage retaining means comprising a railing including side portions, means for retaining said side portions in spaced relation upon the body portion adjacent the fenders, said railing including a further portion extending across and supported upon the trunk door, and means for detachably connecting said side portions to said further portion whereby the latter will move with the trunk door when the same is opened, said last-named means including brackets secured to said body portion between said fenders and door, and a movable member retained on each of said brackets, the free ends of said further portion being secured to said movable members and the adjacent free ends of said side portions being secured to said brackets.

2. The combination of claim 1 wherein each of said brackets includes an attaching flange, a stem, and a knob on said stem, said knob being split horizontally to provide an upper portion constituting said movable member and a lower fixed portion.

3. In an automotive vehicle having a rear body portion, rear fenders, and a trunk door hinged at the rear body portion, said door having side edges each spaced from an adjacent rear fender, a luggage retaining means comprising a railing including side portions, means for retaining each of said side portions on said body portion between each of said side edges and each of said rear fenders, said railing including a further portion extending across said trunk door and having free end portions intersecting said edges, said further portion being supported upon said trunk door, and means for detachably connecting said side portions to said free end portions of said further portion whereby the latter will move with the trunk door when the same is opened.

WILLIAM F. ALLMOND.

REFERENCES CITED

The following references are of record in the file of this patent:

UNITED STATES PATENTS

| Number | Name | Date |
| --- | --- | --- |
| 1,894,083 | Chaney | Jan. 10, 1933 |
| 2,009,721 | Williams | July 30, 1935 |